United States Patent [19]
Nishino et al.

[11] 4,042,420
[45] Aug. 16, 1977

[54] METHOD OF PRODUCING MANGANESE OXIDE SOLID ELECTROLYTE CAPACITOR

[75] Inventors: Atsushi Nishino; Akihiko Yoshida; Hayashi Hayakawa, all of Osaka, Japan

[73] Assignee: Matsushita Electric Industrial Co., Ltd., Japan

[21] Appl. No.: 633,151

[22] Filed: Nov. 18, 1975

[30] Foreign Application Priority Data

Nov. 20, 1974 Japan ............... 49-134055
Nov. 20, 1974 Japan ............... 49-134056
Nov. 20, 1974 Japan ............... 49-134057

[51] Int. Cl.$^2$ .................. C23F 17/00; H01G 9/16
[52] U.S. Cl. ....................... 148/6; 427/126; 427/226; 427/380; 427/80; 204/35 N; 204/38 A; 29/25.41; 29/570
[58] Field of Search .............. 427/80, 380, 226; 204/35 N, 38 A, 96, 56, 42; 29/25.41, 570; 148/6

[56] References Cited
U.S. PATENT DOCUMENTS
3,531,383  9/1970  Lochmann et al. ............... 427/80 X Primary Examiner—Ralph S. Kendall
Attorney, Agent, or Firm—Robert E. Burns; Emmanuel J. Lobato; Bruce L. Adams

[57] ABSTRACT

A manganese dioxide layer of improved quality is formed on the surface of a dielectric oxide coating on a valve-metal substrate by repeating sequential procedures of immersing the substrate in an aqueous solution of manganese nitrate and heating the wet substrate to cause pyrolytic decomposition of manganese nitrate several times on condition that the heating is carried out at least once in a furnace wherein hot air flows and at least once in a semi-closed radiant furnace wherein the decomposition proceeds under a positive pressure of a small magnitude due to prolonged retention of gaseous decomposition products in the heating chamber.

14 Claims, 8 Drawing Figures

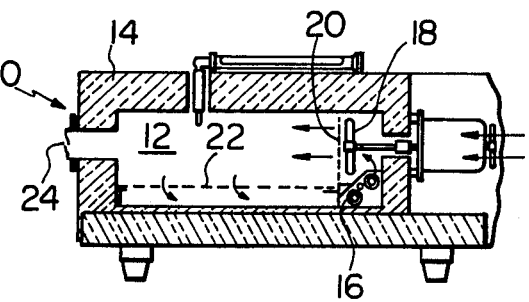
Fig. 1
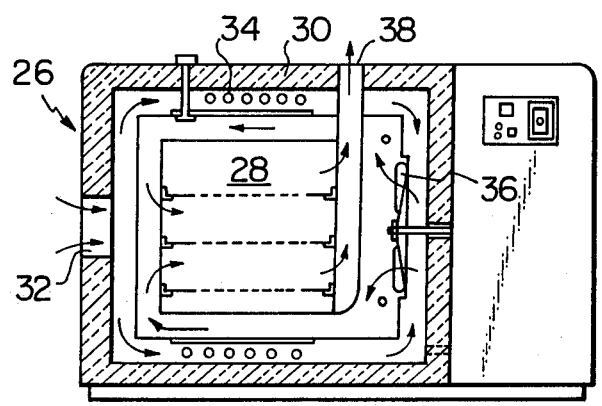
Fig. 2
Fig. 3
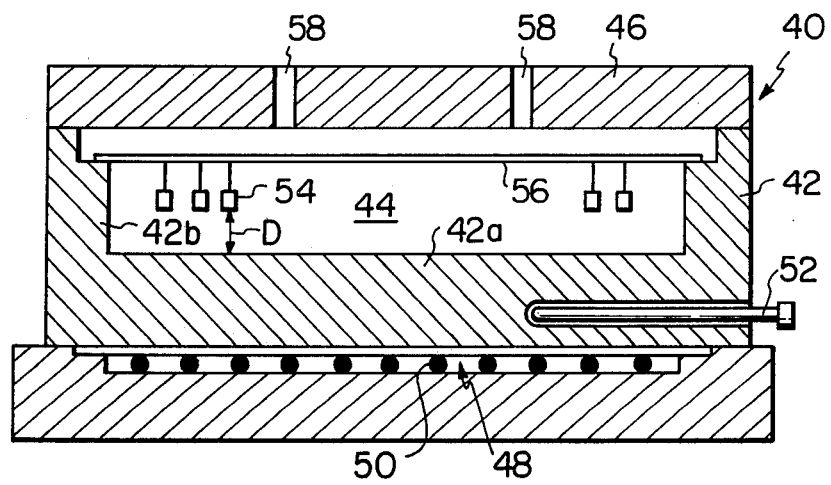

$\overline{10\mu m}$ $\overline{10\mu m}$

10μm

10μm

METHOD OF PRODUCING MANGANESE OXIDE SOLID ELECTROLYTE CAPACITOR

BACKGROUND OF THE INVENTION

This invention relates to a method of producing a solid electrolyte capacitor which has a layer of maganeses dioxide as the solid eletrolyte, and more particularly to a method of forming a maganeses dioxide layer of improved quality on the surface of a dielectric oxide coating formed on the anode.

Manganese dioxide is known and widely used as an excellent electrolyte material in a solid electrolyte capacitor. In conventional methods for the fabrication of a solid electrolyte capacitor having an anode of a valve-metal typified by aluminum and tantalum and a thin layer of manganese dioxide as the electrolyte, the manganese dioxide layer is formed by initially anodizing the valve-metal to form thereon a thin oxide coating which serves as the dielectric of the capacitor, immersing the oxide-coated anode in an aqueous solution of manganese nitrate, and then heating the wet anode to about 130°-135° C in a hot-air conveying or circulating furnace to cause pyrolytic decomposition of the adhering manganese nitrate to manganese dioxide. It is very difficult, however, to form a practically serviceable manganese dioxide layer uniformly over the entire area of the dielectric layer by a single cycle of these procedures. It is necessary to repeat about 10 times a series of procedures consisting of immersion in the manganese nitrate solution, heating for the pyrolytic decomposition and then reforming of the dielectric coating. Throughout the repeated heating, the pyrolytic decomposition of manganese nitrate occurs in a stream of hot air practically under atmospheric pressure and heat for the decomposition is transferred to the wet anode mainly by convection.

A manganese dioxide solid electrolyte capacitor produced by performing the pyrolytic decomposition in the foregoing manner has a capacitance very close or approximately equal to a theoretical value, but involves several shortcomings such as a comparatively large loss value and leakage current, a relatively poor insulation or breakdown voltage and/or an unsatisfactory frequency dependence of the capacitance. These shortcomings are considered to be greatly attributable to physical properties of the manganese dioxide layer of the capacitor. A manganese dioxide layer formed by a conventional pyrolysis process consists of relatively large-sized and irregularly shaped manganese dioxide particles and is very porous, relatively low in density and weak in adhesion strength to the dielectric coating. As an additional disadvantage of such a manganese dioxide layer, the layer tends to have an extremely rugged surface. Sometimes the surface includes local elevations of considerable heights and widths, so that an extra machinning work for removing such elevations is needed in advance of forming a counter electrode on the manganese dioxide layer to encase the produced capacitor element in a predetermined case. The machining work is not only inconvenient to industrial production of the capacitor but also disadvantageous for the quality of the capacitor since this work is liable to damage the dielectric coating and cause an increase in the leakage current.

An improved method for the pyrolytic decomposition of manganese nitrate was proposed recently to obviate the above described disadvantages of a manganese dioxide layer formed by a conventional method. (Among the inventors of the present invention, Nishino and Hayakawa participated in the studies which brought about this improved method.) In this method, the pyrolytic decomposition is carried out in a semi-closed heating chamber of a radiant furnace so that the decomposition may proceed under a positive pressure of a small magnitude attributable to prolonged retention of gaseous decomposition products in the heating chamber. A manganese dioxide layer formed by this method is very smooth and dense due to uniformly distributed and relatively small particle size of the manganese dioxide particles. A solid electrolyte capacitor including this manganese dioxide layer exhibits smaller loss value and leakage current than a similar capacitor produced by the use of a hot-air circulation furnace in forming the manganese dioxide layer.

The capacitor including a manganese dioxide layer formed in a semi-closed radiant furnace, however, has an unfavorable tendency that the capacitance as a relative value to a theoretical value is slightly smaller than the same value for a similar capacitor produced by a conventional method. Additionally, a manganese dioxide layer formed by the improved method is sometimes not satisfactorily resistant to a mechanical stress particularly when the manganese dioxide particles are extremely small-sized and uniformly distributed. This tendency is disadvantageous particularly for producing a relatively large-sized capacitor since the manganese dioxide layer in such a case is liable to be subjected to various stresses during subsequent procedures for providing a counter electrode and a protective cover and the capacitor exhibits an increase in the leakage current.

SUMMARY OF THE INVENTION

It is an object of the present invention to provide a further improved method for the production of a solid electrolyte capacitor including a manganese dioxide layer as the electrolyte, which method obviates all of the above described various disadvantages inherent to the conventional method for the pyrolytic decomposition of manganese nitrate in a hot-air circulation furnace and the recently proposed method utilizing a semi-closed radiant furnace.

It is another object of the invention to provide a method for the production of a solid electrolyte capacitor which is of the above described type and has excellent characteristics in all of the dielectric loss, leakage current, relative capacitance to a theoretical value and resistance to mechanical stresses.

In a method according to the invention, a valve-metal is initially anodized in a usual manner to form thereon a dielectric oxide coating and then wetted with an aqueous solution of manganese nitrate. The wet valve-metal is subjected to heating at 130° to 350° C for pyrolytic decomposition of the adhering manganese nitrate to manganese dioxide, and these sequential steps of wetting and heating are repeated at least once again. As an essential feature of a method according to the invention, the heating is carried out at least once in a furnace of a hot air circulation type of flowing a heated air around the wet valve-metal and at least once in a semi-closed heating chamber of a radiant furnace having a vent the area of which is relatively small with respect to the volume of the heating chamber, wherein heat for the decomposition in the radiant furnace is transferred from the wall of the heating chamber dominantly by radiation and the decomposition proceeds under a positive pressure of a small magnitude due to a relatively prolonged retention of gaseous decomposition products in the heating chamber.

The two different heating processes respectively in the hot air circulation furnace and in the semi-closed radiant furnace can be carried out in any sequence with practically similar and excellent results.

BRIEF DESCRIPTION OF THE DRAWINGS

Other features and advantages of the invention will become apparent from the following detailed description with reference to the accompanying drawings, wherein:

FIG. 1 is a longitudinal sectional view of a conventional furnace of the hot-air circulation type which is used for forming a manganese dioxide layer in a method according to the invention;

FIG. 2 is a longitudinal sectional view of a fundamentally similar but differently constructed conventional furnace as an alternative to the furnace of FIG. 1;

FIG. 3 is a longitudinal sectional view of a semi-closed radiant furnace which also is used in a method according to the invention;

DESCRIPTION OF THE PREFERRED EMBODIMENTS

Figure 4:
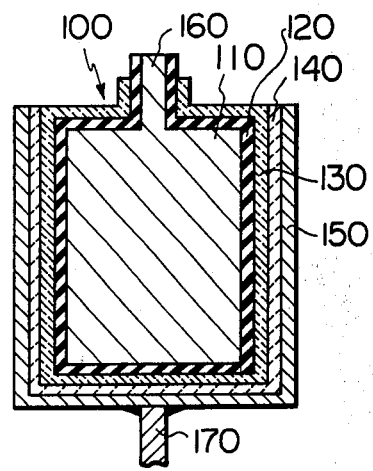
FIG. 4 is a longitudinal sectional view of an example of solid electrolyte capacitors produced by a method of the invention.

In conventional methods for the fabrication of a manganese dioxide solid electrolyte capacitor, the pyrolytic decomposition of an aqueous solution of manganese nitrate applied onto the surface of a dielectric coating formed on a valve-metal anode is carried out in a furnace of the hot-air conveying or circulating type as shown in FIG. 1 or FIG. 2. The furnace 10 of FIG. 1 has a heating chamber 12 which is formed in a heat-insulating wall member of body 14, fin heaters 16, a fan 18 for the circulation of hot-air, a dispersion plate 20 for regulating the flow of hot-air, a rack 22 and a vent damper 24. Also in the furnace 26 of FIG. 2, a heating chamber 28 is formed in a heat-insulating body 30. Air is admitted into the furnace 26 through an inlet 32, heated by pipe heaters 34 and then forced to pass through the heating chamber 28 by a fan 36. A vent is indicated at 38.

When pyrolytic decomposition of manganese nitrate is carried out in the furnace 10 or 26, the decomposition gas which contains oxides of nitrogen ($NO_x$) is expelled from the heating chamber freely or rapidly, so that $NO_x$ exerts little influence on the anode under the treatment.

According to the invention, the pyrolytic decomposition of a manganese nitrate solution is carried out at least once in a radiant furnace in which neither circulation nor stirring of air is forced. Referring now to FIG. 3, the body 42 of a furnace 40 for use in a method according to the invention is not made of heat-insulating material but is made of a highly heat-conductive material, which is selected usually from metals such as iron, nickel, copper and aluminum, including alloys of these metals. Alternatively, the body 42 may be made of non-metallic material which exhibits a good heat conductivity at elevated temperatures as typified by silicon carbide. The furnace 40 has a heating chamber 44 formed in the body 42, a lid member 46 covering the heating chamber 44 and a heating device 48 including heater elements 50 arranged below and adjacent the bottom 42a of the body 42. A usual temperature control apparatus is omitted from the illustrated except for a temperature sensor 52. A valve metal 54 which is coated with a dielectric oxide film and wet with an aqueous solution of manganese nitrate (this will hereinafter be referred to simply as a substrate or a wet substrate) is held in the heating chamber 44, either singularly or in plurality, to avoid any contact with the inner surfaces of the wall 42 and lit 46, for example, by being suspended from a bar-like holder 56. It is an essential requisite to the furnace 40 that the heating chamber 44 is semi-closed during heating. The heating chamber 44 communicates with the atmosphere exclusively through a vent 58 formed in the lid 46. The vent 58 is shown as two apertures, but may take any different form such as a larger number of narrower apertures or at least one slit formed either in the body 42 or in the lit 46. In any way, the total effective sectional area of the vent 58 is determined to be a relatively small value as hereinafter will be described compared with the area of the vent 38 in the presently used furnace 26.

Since pyrolytic decomposition occurs in the semi-closed chamber 44 wherein air is neither forced to circulate nor stirred, the decomposition gas (consisting of steam and oxides of nitrogen) is not freely discharged from the chamber 44 but is retained, at least partly, therein almost over the entire reaction time. Consequently, the substrate 54 is kept under a slightly pressurized atmosphere attributable to the partial pressure of the decomposition gas. The thus created positive pressure of a small magnitude has a favorable effect on the quality of the resulting manganese dioxide layer.

The semi-closed state of the furnace 40 reaction chamber 44 depends on the following variables:

a. the volume V of the chamber 44,
b. the quantity G of the decomposition gas liberated from the wet substrates 54 in the chamber 44,
c. the inner surface area S of the entire wall of the chamber 44,
d. the heat load or the total mass of the heat load, i.e., the total mass W of the substrates 54, and
e. the total area A of the vent 58.

Other variables such as the pressure in the chamber 44, the rate of increase in the temperature of the substrate 54, variations in the quantity of the decomposition gas with progress of the decomposition, and the quantity of heat transferred from the furnace 40 to the substrates 54 in a unit time are determined by the following relationships between the factors (a) to (e).

The pressure in the chamber 44 depends mainly on the following two ratios:

I. (the chamber volume, V)/(the vent area, A),
II. (the gas volume, G)/(the vent area, A).

The excellent properties of the manganese dioxide layer as described hereinbefore can be attained when these ratios take values in the following ranges, respectively.

Figure 5:
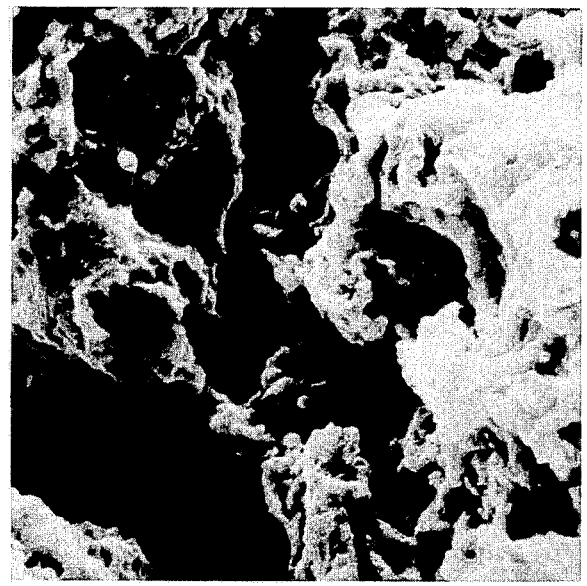
FIG. 5 is a microphotograph taken with a scanning electron microscope of a manganese dioxide layer formed by a conventional method utilizing the furnace of FIG. 1 alone.
Figure 6:
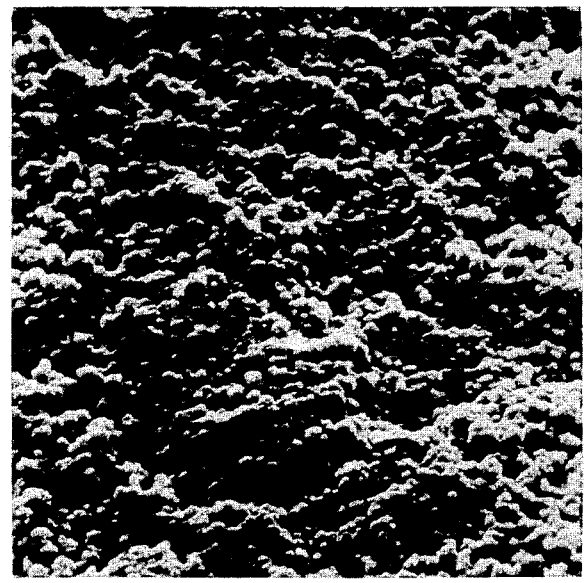
FIG. 6 is a similar microphotograph of a manganese dioxide layer formed by a method utilizing the furnace of FIG. 3 alone.

I. V/A is from 50 to 2000 cm³/cm²
II. G/A is from 100 to 10000 ml/cm³ the microphotograph (1000 magnifications) of FIG. 5 shows a manganese dioxide layer formed by a conventional method wherein the repeated pyrolytic decomposition of manganese nitrate was carried out by the use of the hot air circulation furnace 10 alone. As seen, this layer consists of comparatively large-sized and irregularly shaped particles and has a very coarse or rugged texture. When the same pyrolysis is carried out by the use of the semi-closed radiant furnace 40 alone, a resulting manganese dioxide layer consists of far smaller particles which are densely and uniformly distributed as seen in the microphotograph (1000 magnifications) of FIG. 6. The particle size can be varied within the range from about 0.1 to about 50 μm by altering the heating condition.

A manganese dioxide layer formed by the use of the semi-closed furnace 40 is generally superior to a manganese dioxide layer formed in the hot air circulation furnace 10, but has certain unfavorable tendencies as described previously, which are considered to be attributable to the microscopical structure of the layer.

We have discovered that the disadvantages derived from the use of the semi-closed furnace 40 can be completely obviated without losing any of the inherent advantages by carrying out a part of the repeated pyrolytic decomposition of manganese nitrate in the conventional air circulation furnace 10. A solid electrolyte capacitor including a mangansese dioxide layer obtained by a combined use of the two furnaces 10 and 40 features: that the capacitance as a relative value to a theoretical value is as large as the similarly expressed value of a capacitor produced by the use of the furnace 10 alone; that the magnitude of loss is as small as that of a capacitor produced by the use of the furnace 40 alone; that the leakage current is smaller than that of the capacitor produced by the use of either the furnace 10 or furnace 40 alone; and that the resistance to mechanical stresses is quite excellent.

Figure 7:
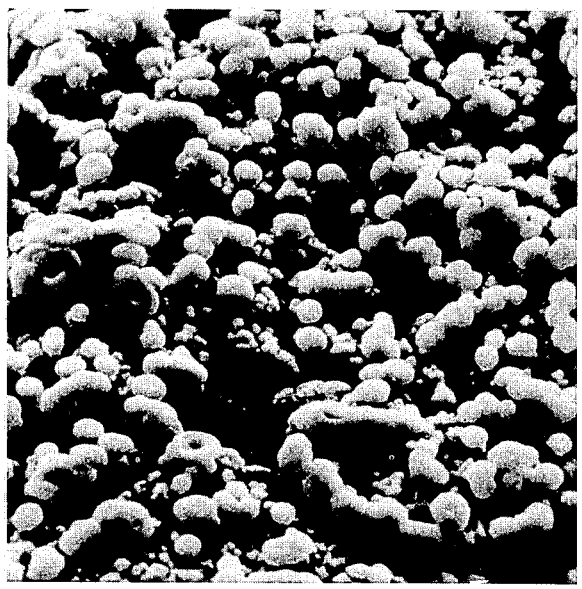
FIGS. 7 and 8 are similar microphotographs showing two different examples of manganese dioxide layers formed by a method according to the invention, respectively.
Figure 8:
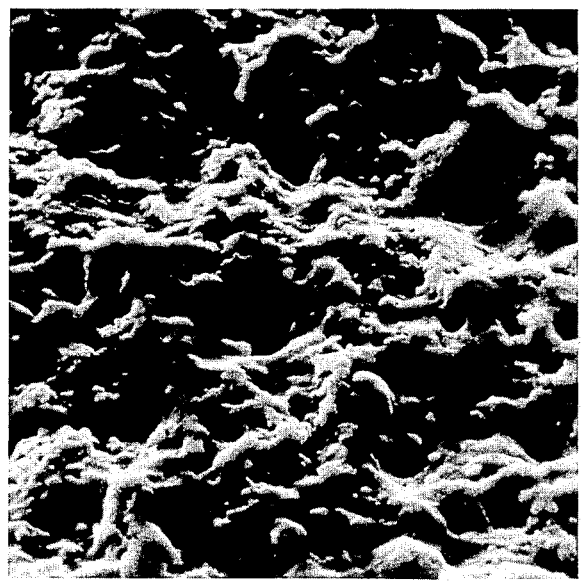

The combined use of the two differently designed furnaces, i.e., a hot air circulation furnace as shown in FIG. 1 or FIG. 2 and a radiant furnace having a semi-closed heating chamber as shown in FIG. 3, results in that the manganese dioxide layer is formed microscopically as a laminated layer wherein at least one sub-layer of comparatively large and irregularly sized particles with a considerably great porosity is interposed between comparatively dense layers of smaller particles. The microphotographs (1000 magnifications) of FIGS. 7 and 8 show two examples of such manganese dioxide layers formed by the procedures as hereinafter will be described in Examples. By reason of such a construction, a manganese dioxide layer formed by the employment of the above described two heating methods has only the advantages resulting from the respective methods. In other words, a capacitor including this layer has a capacitance approximately equal to a theoretical value together with extremely small loss value and leakage current and is very stable and resistant to various stresses as exemplified by a mechanical shock. The combined use of the two furnaces 10 and 40 is particularly profitable when the substrate is relatively large-sized, considering that great difficulty is encountered in forming a manganese dioxide layer of good quality by conventional heating methods.

The above described two different heating methods can be combined variously with practically similarly excellent results. In any combination, however, the first heating is preferably carried out in the furnace 10 of the hot-air circulation type, while the last heating is carried out in the furnace 40 of the semi-closed radiant type. When the heating in the circulation furnace 10 is represented by A and the heating in the radiant furnace 40 by B, any of the following sequences, for example, is permissible.

1. A-A-B-B-A-A-B-B
2. A-A-A-A-B-B-B-B
3. A-A-B-B-B-B-B-B
4. A-B-B-B-A-B-B-B
5. A-B-A-B-A-B-A-B

In a method of the invention, the substrate 54 is prepared by the same procedures as in the conventional methods. A valve metal such as tantalum or aluminum usually in the form of a cylindrically shaped and sintered body is electrolytically oxidized in a solution of phosphoric acid, citric acid or acetic acid to form a thin dielectric oxide film thereon. Then the substrate is immersed in an aqueous solution of manganese nitrate, and the wet substrate is heated in one of the above described furnaces 10 (typified) and 40 to cause pyrolytic decomposition of manganese nitrate to manganese dioxide. The concentration of the manganese nitrate solution may be from about 20 to about 50% by weight as in a conventional method. In a method of the invention, however, the use of a more concentrated solution, i.e., from about 60 to about 80% by weight, is permissible and usually brings about better quality of the manganese dioxide layer. The repeated pyrolysis may be performed either by the use of a single manganese nitrate solution or by the use of two or more differently concentrated solution (in the latter case, a higher concentration is employed at later stages of the repeated pyrolysis). The pyrolytic decomposition of manganese nitrate is carried out within the temperature range from about 130° to about 350° C (as in conventional methods) irrespective of the types of a furnace.

The following Examples are presented to illustrate a method of the invention.

The distance D in FIG. 3 is to be considered as the shortest distance between the substrate 54 and any side of the inner surface of the wall 42 of the heating chamber 44. It is preferable to arrange the substrate 54 in the chamber 44 such that the distance D is in the range from 2 to 10 mm from the viewpoints of both the practicability of the pyrolytic decomposition procedure and achievement of a best result.

EXAMPLE 1

The substrate 54 was prepared by forming a dielectric oxide coating on the surface of a tantalum cylinder, which weighted 3.0 g, in a 10% acetic acid solution at a maximum anodizing potential of 70 V in a period of 2.5 hr. The substrate 54 was immersed in a 60 Wt% aqueous solution of manganese nitrate at 30° C and then subjected to the pyrolytic decomposition at 300° C for 10 min. These immersion and pyrolysis procedures were repeated 8 times in the following sequence.

At first, the pyrolysis was carried out 2 times in succession in the hot-air circulation furnace 10. Then pyrolysis was repeated 2 times in the semi-closed radiant furnace 40. These sequential procedures were repeated once again, so that the immersion and pyrolysis were repeated 8 times in all, 4 times in the hot-air circulation furnace 10 and the other times in the semi-closed furnace 40. As to the semi-closed radiant furnace 40, the above defined ratio V/A was 500 cm³/cm² and the ratio G/A was 4500 ml/cm².

After completion of the repeated pyrolytic decomposition, the substrates which were coated with a manganese dioxide layer were subjected to usual procedures for the production of solid electrolyte capacitors as shown in FIG. 4 a solid electrolyte capacitor 100 of FIG. 4 has a well known structure. An anode 110 is of either tantalum or aluminum and usually in the form of a porous and sintered mass. A dielectric oxide coating 120 is formed by electrolytical oxidation on the surface of the anode 110, and a manganese dioxide layer 130 is formed on the surface of the dielectric 120. A colloidal graphite 140 was applied onto the surface of the manganese dioxide layer 130 followed by application of a conductive paint containing, e.g., silver powder dispersed therein to form a metallic coating 150. A lead 160 extends from the anode 110, and another lead 170 was connected to the coating 160 by soldering. For practical uses, the capacitor 100 may be covered with a protective layer (not shown).

The characteristics of the thus produced capacitor 100 are presented below in Table together with the data obtained in the following two examples and with similar two capacitors produced by repeating the pyrolysis 8 times in succession, one by the use of the furnace 10 alone and the other the furnace 40 alone.

FIG. 7 is a microphotograph (1000 magnifications) of the thus formed manganese dioxide layer.

EXAMPLE 2

Example 1 was repeated except that the pyrolysis was carried out in the following sequence. The hot-air circulation furnace 10 was employed initially until the pyrolysis was consecutively repeated 6 times, and the semi-closed furnace 40 was used for repeating the pyrolysis 2 times thereafter.

EXAMPLE 3

Also this example was generally similar to Example 1, but the two furnaces 10 and 40 were used alternately to repeat the pyrolysis 8 times in all in the order of starting from the hot-air circulation furnace 10.

FIG. 8 is a microphotograph (1000 magnifications) of the manganese dioxide layer formed in this example.

|  | Capacitance (Relative to theoretical value, %) | Loss (tanδ, %) | Leakage Current (20 V, 5 min, μA) | Resistance to shock |
|---|---|---|---|---|
| Example 1 | 99 | 2.1 | 0.5 | excellent |
| Example 2 | 99 | 2.1 | 0.3 | excellent |
| Example 3 | 99 | 2.1 | 0.3 | excellent |
| The furnace 40 alone | 95 | 1.9 | 1.0 | good |
| The furnace 10 alone | 99 | 4.6 | 2.0 | excellent |

What is claimed is:

1. A method of producing a solid electrolyte capacitor having a layer of manganese dioxide as the electrolyte, the method comprising the steps of:
    a. preparing a substrate by forming a dielectric oxide coating on a surface of a valve metal member;
    b. immersing said substrate in an aqueous solution consisting of water and manganese nitrate;
    c. heating the wet substrate to cause pyrolytic decomposition of manganese nitrate to manganese dioxide;
    d. immersing said substrate subsequently to said step (c) in an aqueous solution consisting of water and manganese nitrate; and
    e. heating the wet substrate subsequently to said step (d) to cause pyrolytic decomposition of manganese nitrite to manganese dioxide, one of said steps (c) and (e) being carried out in a furnace of a hot air circulation type by flowing a heated air around said substrate, the other being carried out in a heating chamber of a radiant furnace, said chamber being semi-closed and in communication with the atmosphere exclusively through at least one vent formed in the wall of said chamber, heat for said pyrolytic decomposition in said radiant furnace being transferred from the wall of said chamber dominantly by radiation, said at least one vent having a predetermined area such that said pyrolytic decomposition proceeds under a positive pressure of a small magnitude due to a relatively prolonged retention of gaseous decomposition products in said chamber.

2. A method as claimed in claim 1, wherein at least one of said steps (c) and (e) is carried out at least 2 times, said substrate being immersed in an aqueous solution consisting of water and manganese nitrate in advance of each heating step.

3. A method as claimed in claim 2, wherein said step (c) is carried out in the former furnace consecutively at least 2 times, said step (e) being carried out at least once subsequently to the entire repetition of said step (c).

4. A method as claimed in claim 2, wherein said steps (c) and (e) are carried out alternately.

5. A method as claimed in claim 4, wherein the first heating step is carried out in the former furnace, the last heating step being carried out in the latter furnace under said positive pressure.

6. A method as claimed in claim 1, wherein the concentration of said aqueous solutions in steps (b) and (d) is at least 60% by weight.

7. A method as claimed in claim 1, wherein said small magnitude is in the range from 5 to 100 mmH₂0 in gage pressure.

8. A method as claimed in claim 1, wherein said predetermined area is such that the ratio of the volume of said heating chamber of the latter furnace to the total area of said at least one vent is in the range from 50 to 2000 cm³/cm², while the ratio of the quantity of said gaseous products to said total area is in the range from 100 to 10000 ml/cm².

9. A method of producing a solid electrolyte capacitor having a layer of manganese dioxide as the electrolyte, the method comprising the steps of:
    a. preparing a substrate by forming a dielectric oxide coating on a surface of a valve metal member;
    b. immersing said substrate in an aqueous solution of manganese nitrite;
    c. heating the wet substrate to cause pyrolytic decompositon of manganese nitrite to manganese dioxide in a furnace of a hot air circulation type by flowing heated air around the substrate;
    d. immersing said substrate and in aqueous solution consisting of water and manganese nitrite; and
    e. heating the wet substrate subsequently to said step (d) to cause pyrolytic decomposition of manganese nitrate to manganese dioxide in a heating chamber of a radiant furnace, said chamber being semi-closed and in communication with the atmosphere exclusively through at least one vent formed in the wall of said chamber, heat for said pyrolytic decomposition in said radiant furnace being transferred from the wall of said chamber dominantly by radiaton, said at least one vent having a predetermined area such that said pyrolytic decomposition proceeds under a positive pressure of a small magnitude due to a relatively prolonged retention of gaseous decomposition products in said chamber, a first combination of said steps (b) and (c) being carried out at least once in advance of a second combination of said steps (d) and (e), and said second combination being carried out at least once after said first combination is carried out entirely.

10. A method as claimed in claim 9, wherein at least one of said first and second combinations is carried out at least two times.

11. A method as claimed in claim 10, wherein said small magnitude is in the range from 5 to 100 mmH$_2$0 in gage pressure.

12. A method as claimed in claim 11, wherein said predetermined area is such that the ratio of the volume of said heating chamber of the latter furnace to the total area of said that least one vent is in the range from 50 to 2000 cm$^3$/cm$^2$, while the ratio of the quantity of said gaseous products to said total area is in the range from 100 to 10000 cl/cm$^2$.

13. A method as claimed in claim 11, wherein said steps (c) and (e) are carried out at a temperature of about 130° to about 350° C.

14. A method as claimed in claim 13, wherein the concentration of said aquous solutions in steps (b) and (d) is at least 60% by weight.

* * * * *